Patented Jan. 22, 1946

2,393,560

UNITED STATES PATENT OFFICE 2,393,560

WELL DRILLING MUD AND PROCESS

Everett P. Partridge, Beaver, Pa., assignor to Hall Laboratories, Inc., Pittsburgh, Pa., a corporation of Pennsylvania No Drawing. Application February 18, 1944, Serial No. 522,974

9 Claims. (Cl. 252—8.5)

This application is a continuation-in-part of my copending application, Serial No. 465,456, filed November 13, 1942, which application was a division of my copending application, Serial No. 351,983, filed August 9, 1940.

This invention relates generally to the drilling of oil and similar wells and to a drilling mud for use in the process. In drilling oil wells, for example, it is customary to employ a mud or fluid which serves various purposes which are well known. The drilling mud is circulated from a sump above the ground down through the drill pipe, around the drilling tool where it picks up the chips formed by the drill, and then up the bore to screens where the chips are removed, and to the sump from which the mud is again circulated through the bore. The mud also serves to lubricate the drill pipe, to seal the wall of the bore, and to provide a hydrostatic head which prevents the well from blowing out, in case high formation pressures are encountered.

In order to increase the weight of the drilling mud, it has been customary in the past to add weighting material, such, for example, as barite or hematite. While these or other materials are satisfactory from the standpoint of increasing the weight of the mud, they increase the viscosity of the mud, so that it becomes more difficult to pump. If it is attempted to increase the weight of the mud by increasing the proportion of clay to water either with or without the addition of weighting agents, the viscosity likewise is increased too much.

It has been proposed heretofore to increase the fluidity of the mud by adding thereto a solution of rapidly soluble sodium hexametaphosphate or sodium pyrophosphate. These phosphates have the property of dispersing or deflocculating the mud and making it more fluid. In this manner, when the ratio of solids to water is increased, or weighting materials are added to the mud, the increased viscosity which would result therefrom may be overcome by the use of the rapidly soluble metaphosphate or pyrophosphate.

The use of the rapidly water-soluble metaphosphate or pyrophosphate has resulted in considerable improvement in drilling muds, but is open to certain objections. For example, even if sodium hexametaphosphate or sodium pyrophosphate is added in the solid state to the mud in the sump, it will dissolve in a very short time. The properties of the mud in the sump may thereby be adjusted in a desirable direction insofar as conditions at the surface of the ground are concerned. However, as the mud is circulated downward through the bore, it is subjected to increasing temperatures which may exceed 200° F. The increase in temperature affects the properties of the mud adversely to a greater or less extent and tends to destroy the effects of the dissolved metaphosphate by causing reversion to the ineffective orthophosphate, and likewise to destroy the effect of the dissolved pyrophosphate both by precipitation as highly insoluble calcium or magnesium pyrophosphate and by reversion to the ineffective orthophosphate.

While the loss of metaphosphate or pyrophosphate during circulation through the bore may be made up by further addition of these agents at the surface of the ground, it is difficult to control the conditioning of the mud at the surface so that it will exhibit optimum properties at increased temperatures deep in the bore, without at the same time overtreating with respect to surface conditions and hastening the approach of the time when the mud will no longer respond to treatment because of the accumulation of chemicals in it.

In accordance with the preferred manner of carrying out the present invention, finely divided solid particles of crystalline alkali-metal metaphosphate substantially insoluble in water but slowly reactive in a drilling mud are introduced into the mud and are circulated with the mud down the bore. The crystalline alkali-metal metaphosphates employed have limiting solubilities in pure water of less than 0.005 per cent or only 50 parts per million parts of water at ordinary temperatures. They are thus in an entirely different category from the sodium phosphate glasses, such as sodium hexametaphosphate or Graham's salt, which may rapidly be dissolved in pure water to produce solutions containing 25 per cent or even much more of the glass, or from sodium pyrophosphate, which may rapidly be dissolved in pure water at ordinary temperatures to the extent of about 7 per cent. The insoluble crystalline alkali-metal metaphosphates dissolve in pure water to an extent of less than $1/1000$ as much as tetrasodium pyrophosphate, $Na_4P_2O_7$, the least soluble at ordinary temperatures of the water-soluble phosphates hitherto employed in the treatment of drilling mud. Although substantially insoluble in pure water, the solid particles of these alkali-metal metaphosphates react slowly and continuously in the mud to maintain the desired properties in it and particularly to maintain the mud in a suitably fluid condition.

The term "molecularly dehydrated phosphate" is recognized as describing those phosphate compounds which may be regarded as derived from phosphoric acid or monobasic or dibasic orthophosphate or mixtures thereof by removal of water of constitution. Thus sodium metaphosphate is a molecularly dehydrated phosphate which may be regarded as derived from monobasic sodium orthophosphate according to the following reaction:

When the heating is limited to the range above 300° C. and below 500° C., preferably between 400 and 450° C., the product consists almost entirely of the insoluble form or forms of sodium metaphosphate commonly known as Maddrell salt. It may be contaminated with a few percent of soluble sodium trimetaphosphate, which, however, is ineffective in reducing the viscosity of drilling mud. The insoluble crystalline sodium metaphosphate, which is soluble in pure water only to the extent of about 5 to 10 parts per million, is one of the materials which I may use according to the present invention.

On the other hand, heating between 500 and 625° C. results in a product consisting chiefly of the soluble crystalline form known as sodium trimetaphosphate. At 625° C., this form melts. If the melt obtained at or above 625° C. is quenched, the product is the very rapidly and highly soluble sodium metaphosphate glass commonly known as sodium hexametaphosphate or Graham's salt. The crystalline form known as sodium trimetaphosphate and the glass known as Graham's salt are excluded from the present invention, because of their high solubilities and rates of solution. Furthermore, sodium trimetaphosphate is ineffective as a dispersing agent.

Just as sodium metaphosphate may be regarded as derived from monobasic sodium orthophosphate, potassium metaphosphate may be regarded as derived from monobasic potassium orthophosphate:

Crystalline potassium metaphosphate prepared at any temperature up to its melting point slightly above 800° C. is, however, substantially insoluble in pure water, dissolving to the extent of about 40 parts per million and thus corresponding to the Maddrell salt of sodium metaphosphate. Both the insoluble crystalline sodium metaphosphate and the insoluble crystalline potassium metaphosphate were described by R. Maddrell in Philosophical Magazine, series 3, vol. 30 (1847), page 329, and have been called salts of monometaphosphoric acid or monometaphosphates by T. Fleitmann in Poggendorf's Annalen, vol. 78 (1849), pages 360–363. Crystalline potassium metaphosphate is another molecularly dehydrated alkali-metal phosphate included within the scope of the present invention. A glassy form of potassium metaphosphate which is very rapidly and highly soluble may be obtained by quenching from the melt, if the latter is cooled very rapidly in very thin layers. This glassy form of potassium metaphosphate is excluded from the present invention, because it is of the same order of solubility as the glassy sodium metaphosphate commercially known as Graham's salt and is open to the objections above pointed out.

Commercially, the crystalline alkali-metal metaphosphates may be made from phosphoric acid and a convenient compound of the desired alkali-metal, such as an oxide, hydroxide, carbonate, or chloride, sufficient heat being applied to drive off substantially all of the water and, in the case of metal salts, such as the carbonate or chloride, to drive off also the acidic constituent, such as carbon dioxide or hydrogen chloride.

The rate of solution and limiting solubility of alkali-metal phosphates of the metaphosphate composition vary over an extremely wide range. Thus 100 grams of commercial sodium phosphate glass with a molar ratio of $Na_2O$ to $P_2O_5$ of about 1.1 to 1, when used in the form of flat pieces of broken glass approximately 3/32 inch thick, may readily be dissolved completely in one liter of pure water in less than an hour, thus producing a concentration of 100,000 parts per million parts of water. Even higher concentrations are easily and rapidly obtained. When this readily soluble glass of the Graham's salt type is ground to pass a 100-mesh screen and be retained on a 200-mesh screen, 100 grams of the resultant powder stirred in 1 liter of water will dissolve in 1 minute. A second quantity of 100 grams of the powdered glass may then be dissolved almost as rapidly, and likewise a third, producing a concentration of 300 grams of the glass in 1000 grams of water, or 300,000 parts per million parts of water within a total time of only a few minutes. The rate of dissolving of further quantities becomes somewhat slower because of the increasing viscosity of the solution, but a concentration of 1500 grams of the glass in 1000 grams of water may easily be attained within an hour.

On the other hand, when 100 grams of the insoluble crystalline form of sodium metaphosphate commonly known as Maddrell salt as commercially made and ground to pass a 100-mesh screen and be retained on a 200-mesh screen and then washed to remove any small fraction of soluble trimetaphosphate, is added to one liter of water, not more than about 0.01 gram is dissolved at the end of an hour, thus producing a concentration of less than 10 parts per million. This very low value is, moreover, a limiting solubility in pure water. The crystalline potassium metaphosphate likewise has a very low limiting solubility in pure water of about 40 parts per million, similar to that of the Maddrell salt.

I have found that, most unexpectedly, the crystalline alkali-metal metaphosphates used according to the present invention, while substantially insoluble in pure water, nevertheless react slowly in a drilling mud to produce a dispersing and deflocculating effect. This is thought to be due to the presence in the aqueous phase of the mud of metallic ions which undergo an exchange with the metal ions present in the crystal lattice of the insoluble metaphosphate, thereby causing some of the latter to enter solution. Whatever the explanation, it is an observed fact that the viscosity of a mud may be decreased by addition of water-insoluble alkali-metal metaphosphate in a manner which suggests that the material known to be insoluble in water is slowly and continuously reactive in the mud. The rate of reaction of the crystalline metaphosphates in drilling mud as used according to my invention is only a small fraction of the rate of reaction of a sodium phosphate glass such as Graham's salt.

The effect of additions of very slowly reactive crystalline sodium metaphosphate and very slowly reactive crystalline potassium metaphosphate to drilling mud in decreasing the viscosity and gel strength of the mud are shown in Table I. The following tests were carried out:

A mud was made up to contain 10% of clay, 20% of ground barite and 3% of bentonite and was aged with stirring. To a 2000-gram portion of the aged mud was added 3 grams of the material to be tested, ground to pass a 200-mesh screen. The sample was then thoroughly mixed and allowed to stand 0.5 hour, when the viscosity and 5-minute gel strength were determined by means of a McMichael viscosimeter. The sample was then allowed to stand overnight, approximately 15 hours, after which it was mixed thoroughly, and the viscosity and gel strength were again determined. The sample was then heated to 80° C. for 2 hours and allowed to cool and stand overnight, after which the viscosity and gel strength were again determined.

The original mud with no addition of treating chemical had a viscosity of 64 poises at 20 R. P. M., and a 5-minute gel strength of 341 on an arbitrary scale.

creases in viscosity were not as pronounced as in the case of the synthetic mud. Nevertheless, it is noteworthy that significantly greater effects were produced by the addition to the mud of the crystalline potassium metaphosphate than by the sodium metaphosphate glass after the mud had stood overnight or had been heated.

In the treatment of drilling mud with slowly reactive crystalline alkali-metal metaphosphates, the treating material apparently must react with the liquid phase of the mud before it can produce its desired effect. The rate at which treating material actually becomes available depends, therefore, not only on the fundamental rate of reaction of the material, but also on the area of surface of the material exposed, which depends on its particle size and the amount added to the mud. In general, the material need be ground

*Table I.—Synthetic mud*

| No. | Treating material | Viscosity, poises | | | 5-min. gel strength arbitrary units | | |
|---|---|---|---|---|---|---|---|
| | | 0.5 hr. | Overnight | 2 hr. at 80° C. to overnight | 0.5 hr. | Overnight | 2 hr. at 80° C. to overnight |
| | No treating material | 64 | 76 | 82 | 341 | 379 | 401 |
| | Sodium metaphosphate glass (Graham's salt) | 10.5 | 13.5 | 35.5 | 82 | 94 | >125 |
| 1 | NaPO₃ (Maddrell salt) (crystalline) | 45 | 13 | 14 | >125 | 69 | 77 |
| 2 | KPO₃ (crystalline) | 13.5 | 9 | 16 | 85 | 72 | 94 |

It will be seen from Table I that both of the numbered materials greatly reduced the viscosity of the mud, particularly after the mud had stood for a time or after it had been heated. Furthermore, both of the numbered materials decreased the gel strength of the mud. It will be noted also that both the very slowly reactive crystalline sodium metaphosphate and the slowly reactive crystalline potassium metaphosphate proved superior to the rapidly soluble sodium metaphosphate glass with respect to maintaining a lower viscosity in the mud after heating. These results are believed to be due to the fact that these materials react slowly to maintain the amount of alkali-metal metaphosphate in the solution phase in the mud necessary for dispersion of deflocculation, replacing continuously the active material which is being lost due to reversion or precipitation. The water-insoluble alkali-metal metaphosphates likewise disperse and deflocculate in a similar manner aqueous suspensions of the individual solid components of the drilling mud, that is, clay, barite and bentonite.

The behavior of slowly reactive crystalline potassium metaphosphate was also verified upon an actual formation mud which had already been heavily treated in the field with a variety of chemicals. The results are shown in Table II.

only to a particle size sufficiently small to allow it to remain in suspension in the mud, but if a material with a particularly slow rate of reaction is to be employed, it may be ground more finely in order to avoid the necessity for maintaining a large amount of the treating material as solid particles in the mud.

In carrying out the process of conditioning well drilling mud by means of crystalline alkali-metal metaphosphates slowly reactive in the drilling mud, I prefer to maintain a reserve of undissolved solid particles of the treating material in the mud as it is circulated throughout the cycle, adding more of the treating material to the mud continuously or at intervals to make up the unavoidable losses, and controlling this makeup by testing the properties of the mud at intervals. The test methods heretofore employed are suitable in which the viscosity of the mud is measured in an approximate manner by the time of efflux of a given quantity from a Marsh funnel, or more precisely by a viscometer. The tests should preferably be carried out with the mud held at approximately the maximum temperature in the bore hole, although an experienced operator may be able to maintain satisfactory control by testing the mud at its temperature at the surface of the ground.

*Table II.—Formation mud*

| No. | Treating material | Viscosity, poises | | | 5-min. gel strength arbitrary units | | |
|---|---|---|---|---|---|---|---|
| | | 0.5 hr. | Overnight | 2 hr. at 80° C. to overnight | 0.5 hr. | Overnight | 2 hr. at 80° C. to overnight |
| | Mud treated in the field | 16 | 15.5 | 17 | 72 | 71 | 72 |
| | Sodium metaphosphate glass (Graham's salt) | 11.5 | 12.5 | 16.5 | 57 | 53 | 64 |
| | KPO₃ (crystalline) | 20 | 10.5 | 10.5 | 107 | 55 | 62 |

In this case, as the mud was already satisfactorily dispersed or deflocculated, the further de- Initial adjustment of a previously untreated mud to the desired level of viscosity may require the addition at the start of a greater amount of slowly reactive crystalline alkali-metal metaphosphate than would have been necessary if rapidly soluble sodium metaphosphate glass or sodium pyrophosphate had been used. In most cases the desired initial adjustment will be obtained by the addition of from 0.1 to 0.4 per cent of the slowly reactive crystalline alkali-metal metaphosphate based on the weight of the mud. The additional amount of the slowly reactive material required to maintain optimum conditions during further operation and the total amount required to complete a bore will, however, be less than if rapidly soluble treating material were employed. So-called "cutting," "clabbering," or over-treatment of the mud by the added chemicals will accordingly be delayed or entirely obviated.

A unique advantage of the process herein described is the automatic response to increase in temperature as the mud circulates down the bore. When the rapidly soluble molecularly dehydrated phosphates are introduced into and dissolve in the mud at the surface of the ground, the effect of increase in temperature as the mud descends the bore is to accelerate the loss of treating chemical by precipitation or reversion or by both undesirable reactions. In contrast, when finely divided slowly reactive crystalline alkali-metal metaphosphates are introduced into the mud, only a limited amount goes into solution. As the temperature increases during passage down the bore, there is an increase in the rate of loss of the effective chemical in solution, but this is offset by the increased rate at which the solid particles of the treating material react to supply fresh chemical to the solution.

Another advantage of the slowly reactive crystalline alkali-metal metaphosphates is that they can be stored and handled in humid atmospheres with much less tendency toward caking than is exhibited by the readily soluble molecularly dehydrated phosphates heretofore employed. This renders possible the preparation, storage and use of dry mixtures of the water-insoluble sodium metaphosphate or water-insoluble potassium metaphosphate with clay, with bentonite, with weighting agents such as barite, or with any or all of the permanently solid components of a drilling mud prior to the introduction of the mixture of materials into the drilling mud. In this manner, solid material which would normally increase the viscosity when added to the drilling mud may have this undesirable characteristic balanced to any desired degree by admixture of the proper amount of the non-hygroscopic crystalline sodium or potassium metaphosphate, which will slowly react in the drilling mud as the mixture is added to the mud and will offset the tendency of the added permanently solid material to increase the viscosity of the mud.

It will be apparent to one skilled in the art of dispersing or deflocculating clays, pigments, fillers, and finely divided oxides, salts, and mineral matter in general that the slowly reactive crystalline alkali-metal metaphosphates may be utilized to advantage as dispersing or deflocculating agents in many operations other than the conditioning of mud in the drilling of bore holes.

Although I have described certain preferred materials and method for carrying out the invention, it is to be understood that the invention may be otherwise embodied or practiced within the scope of the following claims.

I claim:

1. Well drilling mud, comprising an aqueous dispersion of clay and solid particles of crystalline alkali-metal metaphosphate having a solubility in water of the order of not over about $1/1000$ of the solubility in water of tetrasodium pyrophosphate.

2. Well drilling mud, comprising an aqueous dispersion of clay and solid particles of crystalline sodium metaphosphate having a solubility in water of the order of not over about $1/1000$ of the solubility in water of tetrasodium pyrophosphate.

3. Well drilling mud, comprising an aqueous dispersion of clay and solid particles of crystalline sodium metaphosphate commonly known as Maddrell salt and having a solubility in water of the order of not over about $1/1000$ of the solubility in water of tetrasodium pyrophosphate.

4. Well drilling mud, comprising an aqueous dispersion of clay and solid particles of crystalline alkali-metal monometaphosphate having a solubility in water of the order of not over about $1/1000$ of the solubility in water of tetrasodium pyrophosphate.

5. Well drilling mud, comprising an aqueous dispersion of clay and solid particles of crystalline potassium metaphosphate having a solubility in water of the order of not over $1/1000$ of the solubility in water of tetrasodium pyrophosphate.

6. The process of controlling the viscosity of aqeous well drilling mud, which comprises adding thereto solid particles of crystalline alkali-metal metaphosphate having a solubility in water of the order of not over about $1/1000$ of the solubility in water of tetrasodium pyrophosphate.

7. An aqueous dispersion of finely divided solid material and a small proportion as compared with the finely divided solid material of solid particles of crystalline alkali-metal metaphosphate having a solubility in water of the order of not over about $1/1000$ of the solubility in water of tetrasodium pyrophosphate.

8. Well drilling mud, comprising an aqueous dispersion of clay and solid particles of crystalline alkali-metal metaphosphate having a limiting solubility in pure water at ordinary temperatures of less than 0.005% but reactive in the drilling mud to control the viscosity of the mud.

9. Well drilling mud, comprising an aqueous dispersion of clay, weighting agent, and solid particles of crystalline alkali-metal metaphosphate having a limiting solubility in pure water at ordinary temperatures of less than 0.005% but reactive in the drilling mud to control the viscosity of the mud.

EVERETT P. PARTRIDGE.